(12) United States Patent
Javidi et al.

(10) Patent No.: US 10,674,139 B2
(45) Date of Patent: Jun. 2, 2020

(54) METHODS AND SYSTEMS FOR HUMAN ACTION RECOGNITION USING 3D INTEGRAL IMAGING

(71) Applicant: University of Connecticut, Farmington, CT (US)

(72) Inventors: Bahram Javidi, Storrs Mansfield, CT (US); Pedro Latorre Carmona, Castellón de la Plana (ES); Eva Salvador Balaguer, Castellón de la Plana (ES); Fiberto Pla Bañon, Castellón de la Plana (ES)

(73) Assignee: University of Connecticut, Farmington, CT (US)

( * ) Notice: Subject to any disclaimer, the term of this patent is extended or adjusted under 35 U.S.C. 154(b) by 71 days.

(21) Appl. No.: 15/172,943

(22) Filed: Jun. 3, 2016

(65) Prior Publication Data
US 2016/0360186 A1  Dec. 8, 2016

Related U.S. Application Data

(60) Provisional application No. 62/170,370, filed on Jun. 3, 2015.

(51) Int. Cl.
*H04N 13/275* (2018.01)
*G06K 9/62* (2006.01)
(Continued)

(52) U.S. Cl.
CPC ........... *H04N 13/275* (2018.05); *G06F 3/017* (2013.01); *G06K 9/00355* (2013.01);
(Continued)

(58) Field of Classification Search
CPC .. H04N 13/275; H04N 13/232; H04N 13/243; H04N 13/282; G06T 7/73;
(Continued)

(56) References Cited

U.S. PATENT DOCUMENTS 6,072,494 A   6/2000 Nguyen
6,128,003 A  10/2000 Smith et al.
(Continued)

FOREIGN PATENT DOCUMENTS

| CN | 101894276 A | * | 11/2010 | ......... G06K 9/00335 |
|---|---|---|---|---|
| CN | 101894276 A | * | 11/2010 | ......... G06K 9/00335 |
| CN | 101894276 B | *  | 9/2012 | ......... G06K 9/00335 |

OTHER PUBLICATIONS

Cho et al. ("Three-dimensional tracking of occluded objects using integral imaging," Opt. Lett. 33, 2737-2739 (2008)) (Year: 2008).*

(Continued)

*Primary Examiner* — Maria E Vazquez Colon
(74) *Attorney, Agent, or Firm* — Michael Best & Friedrich LLP

(57) ABSTRACT

The present disclosure includes systems and methods for detecting and recognizing human gestures or activity in a group of 3D volumes using integral imaging. In exemplary embodiments, a camera array including multiple image capturing devices captures multiple images of a point-of-interest in a 3D scene. The multiple images can be used to reconstruct a group of 3D volumes of the point-of-interest using the images. The system detects spatiotemporal interest points (STIPs) in the group of 3D volumes and assigns descriptors to each of the plurality of STIPs. The descriptors are quantized into a number of visual words to create clusters of the group of 3D volumes. The system builds a histogram for each of the visual words. Each 3D volume is classified using the histogram of the plurality of visual words, implying the classification of a human gesture in each 3D volumes.

22 Claims, 9 Drawing Sheets

(51) Int. Cl.
| | |
|---|---|
| *H04N 13/243* | (2018.01) |
| *H04N 13/282* | (2018.01) |
| *G06K 9/00* | (2006.01) |
| *G06K 9/46* | (2006.01) |
| *G06K 9/20* | (2006.01) |
| *H04N 13/232* | (2018.01) |
| *G06T 7/73* | (2017.01) |
| *G06F 3/01* | (2006.01) |
| *G06K 9/32* | (2006.01) |

(52) U.S. Cl.
CPC .......... *G06K 9/209* (2013.01); *G06K 9/4676* (2013.01); *G06K 9/6269* (2013.01); *G06T 7/73* (2017.01); *H04N 13/232* (2018.05); *H04N 13/243* (2018.05); *H04N 13/282* (2018.05); *G06K 2009/3291* (2013.01); *G06K 2209/40* (2013.01); *G06T 2200/21* (2013.01); *G06T 2207/10052* (2013.01); *G06T 2207/30196* (2013.01)

(58) Field of Classification Search
CPC ....... G06T 2200/21; G06T 2207/10052; G06T 2207/30196; G06F 3/017; G06K 9/00355; G06K 9/209; G06K 9/4676; G06K 9/6269; G06K 2009/3291; G06K 2209/40
See application file for complete search history.

(56) References Cited

U.S. PATENT DOCUMENTS

| | | | |
|---|---|---|---|
| 7,242,449 | B1 | 7/2007 | Yamazaki et al. |
| 9,185,391 | B1* | 11/2015 | Prechtl ................. H04N 13/194 |
| 2009/0160985 | A1* | 6/2009 | Javidi ................ G06K 9/00214 |
| | | | 348/294 |
| 2012/0194649 | A1* | 8/2012 | Javidi .................. G06K 9/6247 |
| | | | 348/50 |
| 2015/0269427 | A1* | 9/2015 | Kim ................... G06K 9/00369 |
| | | | 348/159 |

OTHER PUBLICATIONS

"Three-Dimensional Optical Sensing and Visualization Using Integral Imaging," in Proceedings of the IEEE, vol. 99, No. 4, pp. 556-575, Apr. 2011. doi: 10.1109/JPROC.2010.2090114 (Year: 2011).*
L. Chen, H. Wei, and J. Ferryman, "A Survey of Human Motion Analysis Using Depth Imagery" Pattern Recognition Letters, 34, 1995-2006 (2013).
J. Han, L. Shao, D. Xu, J. Shotton, "Enhanced Computer Vision with Microsoft Kinect Sensor: A Review", IEEE Trans. on Cybernetics, 43, 5, 1318-1334 (2013).
V.J. Traver et al. Paper entitled "Human Gesture Recognition Using Three Dimensional Integral Imaging" J. Opt. Soc Am. A 31(10):2312-2320 (2014). [9 pages].
D, LeMaster et al., "Mid-Wave Infrared 3D Integral Imaging at Long Range" J. Display Technology 9(7): 545-551 [7 pages].
U.S. Appl. No. 62/170,370, filed Jun. 3, 2013.

* cited by examiner

METHODS AND SYSTEMS FOR HUMAN ACTION RECOGNITION USING 3D INTEGRAL IMAGING

CROSS-REFERENCE TO RELATED PATENT APPLICATIONS

This application claims priority to and benefit of U.S. Provisional Patent Application No. 62/170,370, filed Jun. 3, 2015, the disclosure of which is incorporated herein by S reference in its entirety.

FIELD OF THE DISCLOSURE

The present disclosure contained herein is in the general field of imaging methods and systems for 3D recognition and monitoring of human actions and gestures.

BACKGROUND OF THE DISCLOSURE

Applications of three-dimensional (3D) optical image sensing and visualization technologies span a wide range of areas including TV broadcasting, 3D displays, entertainment, medical sciences, and robotics. An advantage of 3D in relation to traditional two-dimensional (2D) imaging techniques is its capability to capture the structural information of different objects that are in a scene. One promising 3D approach is based on integral imaging or integral photography, which is an autostereoscopic imaging method used to capture 3D information and to visualize it in 3D space, either optically or computationally. The system operates under incoherent or ambient light, thus sensing can be performed passively unlike holography or laser detection and ranging (LADAR) that require lasers. Integral imaging can provide the 3D profile and range of the objects in the scene, thus it is attractive for 3D object recognition. The number of cameras and pixels and the sensing parallax that are optimum for image pickup depend on a number of parameters including object size, distance, and depth.

Recognizing human activity from visual sources has been receiving significant attention from the computer vision and machine learning communities over the last few decades.

Regarding the visual source, most of the past work on action recognition has focused on monocular gray-level 2D sequences. Recently, some efforts have been made to use depth information, mainly because of the popularization of RGB-D systems. There are three main approaches for depth sensing based on stereo, time of flight, and structured light, and these have been applied to human sensing in general and for gesture recognition in particular. Integral imaging can contribute to this area because of its capability to reconstruct 3D scenes at different depths. This information, as well as the other benefits of integral imaging discussed above, can be used to help in the action recognition process.

These and other needs are effectively addressed by the systems and methods of the present disclosure.

SUMMARY OF THE DISCLOSURE

Embodiments of the present disclosure include systems and methods for detecting human gestures in a group of 3D volumes using integral imaging. In exemplary embodiments, the system includes a camera array including multiple image capturing devices or a single camera with a lenslet array. The camera array captures multiple images of a point of interest including at least one human element in a 3D scene. The human element can be a human gesture or activity. The system further includes a computing system operatively coupled to the camera array. The computing system receives the multiple images and reconstructs a group of 3D volumes of the point-of-interest including the at least one human element using the images. The computing system detects spatiotemporal interest points (STIPs) in the group of 3D volumes and creates a series of descriptors in the spatial location of the STIPs. The descriptors are quantized in a number of visual words using clustering. Each cluster of a group of clusters is assigned an STIP and each cluster number represents a visual word. The system builds a histogram for each video, creating the so-called Bag-of-Words (BoWs) for that video. Each human gesture is then classified for each of the 3D volumes.

In exemplary embodiments, the images and the group of 3D volumes are a still image or a moving image. The images include multiple elemental images including the at least one human element. The elemental images are 2D images of different views of the point-of-interest. The elemental images are used to reconstruct the group of 3D volumes by back projecting the elemental images through a pinhole array.

In exemplary embodiments, either a histogram of gradients (HOG) or a histogram of optical flow (HOF) are computed around the STIPs and form the corresponding descriptors.

In exemplary embodiments, a support vector machine (SVM) is used to classify each Bag of Words (BoWs) of each video.

In exemplary embodiments, the detected human gesture or activity can be, but is not limited to: facial expressions, eye movements, movements of the lips and mouth, movements of the torso, movements of the body, movements of the arm, movements of the hand, movements of the finger, movements of the leg, movements of the foot and/or movements of any body part. The human gesture or activity can be stationary or dynamic.

In exemplary embodiments, the images can be captured from a predetermined distance, which can be greater than one kilometer. The human element is detected in the plurality of images captured at a distance greater than or equal to one kilometer by adjusting optics and parallax of the camera array to a predetermined level while capturing the plurality of images. The camera array includes infrared cameras of a variety of spectral bands, configured to capture elemental images of the point-of-interest to detect an human element at distance greater than or equal to one kilometer.

In exemplary embodiments the human element can be detected in the 3D scene even if it's partially occluded by a plurality of obscurations.

Any combination or permutation of embodiments is envisioned. Additional advantageous features, functions and applications of the disclosed assemblies, systems and methods of the present disclosure will be apparent from the description which follows, particularly when read in conjunction with the appended figures. The references, publications and patents listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF THE DISCLOSURE

The exemplary embodiments disclosed herein are illustrative of methods and related systems to recognize actions and/or gestures, particularly human actions and/or gestures, using 3D (three-dimensional) information acquired by the application of integral imaging techniques.

Therefore, details disclosed herein with reference to exemplary systems/assemblies and associated processes/techniques of assembly and use are not to be interpreted as limiting, but merely as the basis for teaching one skilled in the art how to make and use the advantageous assemblies, systems and methods of the present disclosure.

Figure 1:
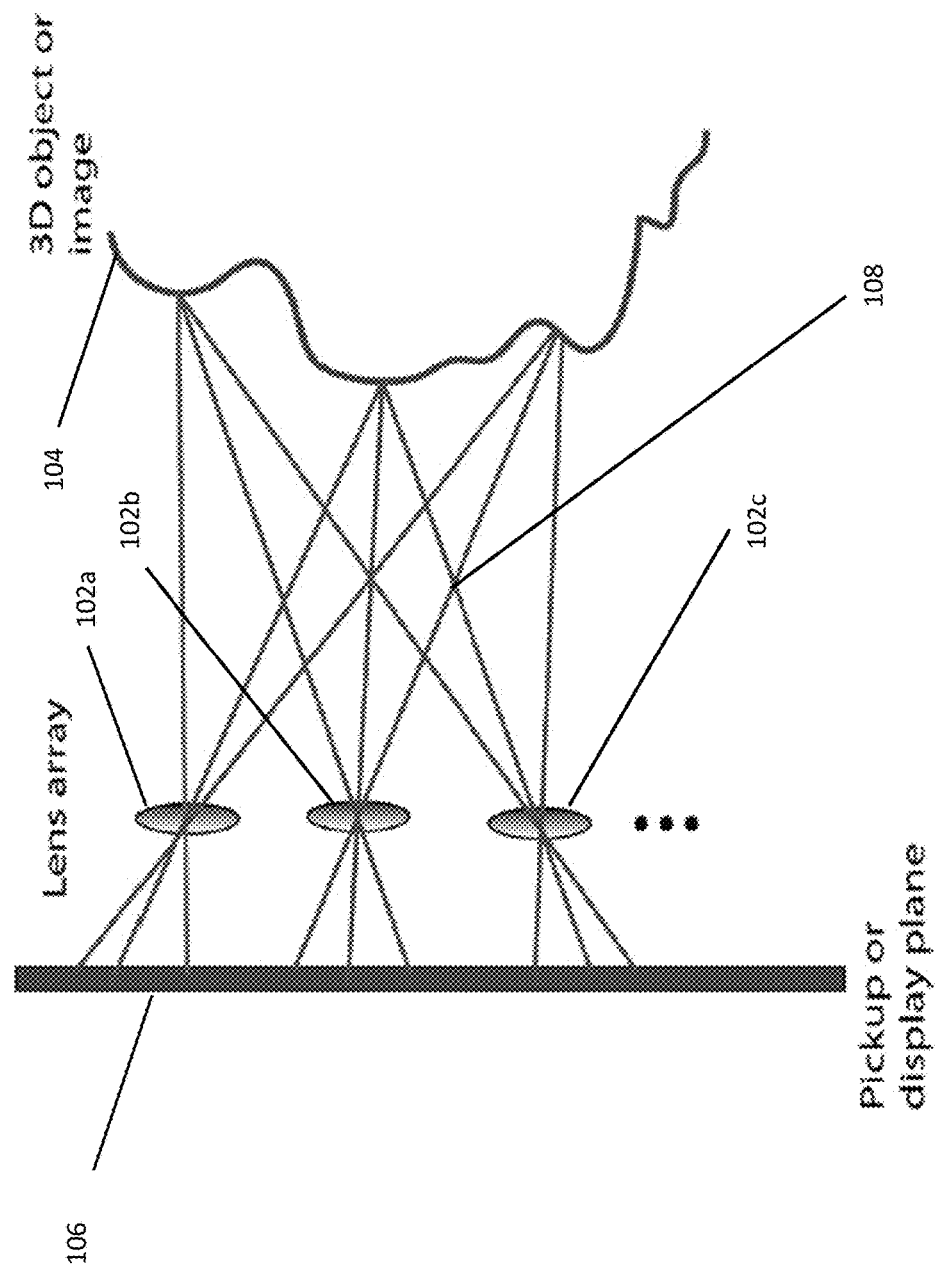
FIG. 1 is an illustration of the principle of integral imaging capture and display according to the present disclosure.

Integral imaging is an autostereoscopic imaging method used to capture 3D information and to visualize it in 3D space, either optically or computationally. Unlike holography that requires a coherent source, integral imaging can work under ambient or incoherent light and, as a result, the sensing can be performed passively. With reference to FIG. 1, an illustration of the principle of integral imaging capture and display according to the present disclosure is provided. Acquisition and visualization of 3D objects using integral imaging can be divided into two different stages called pickup and reconstruction. In the pickup stage, multiple 2D images (referred to as elemental images) are captured through an array of small lenses (lenslet array) 102a-c or an array of cameras. Each lenslet 102a-c can contain a unique projective transformation that maps the 3D object space or image 104 onto 2D elemental images and is a function of the lenslet 102a-c position and the focal length. For example, the lenslet 102a-c can capture the 3D object space or image 104 at different angles and positions as shown by the projected rays 108. As a result, an array of inverted real images is formed on the image sensor. In the reconstruction stage, 3D scene reconstruction can be performed optically or computationally. Computational reconstruction of the 3D object space or image 104 can be achieved by simulating the optical back-projection of elemental images in the computer. This reconstruction method uses a computer synthesized virtual pinhole array for inverse mapping of each elemental image into the object space. All elemental images are computationally overlapped afterward. With this process, the intensity distribution can be reconstructed at arbitrary planes inside the 3D object volume. The 3D object space or image includes depth information that can be recovered by post-processing the elemental images. Each elemental image is back-projected through its own viewpoint on the pick-up or display pane 106.

Figure 2A:
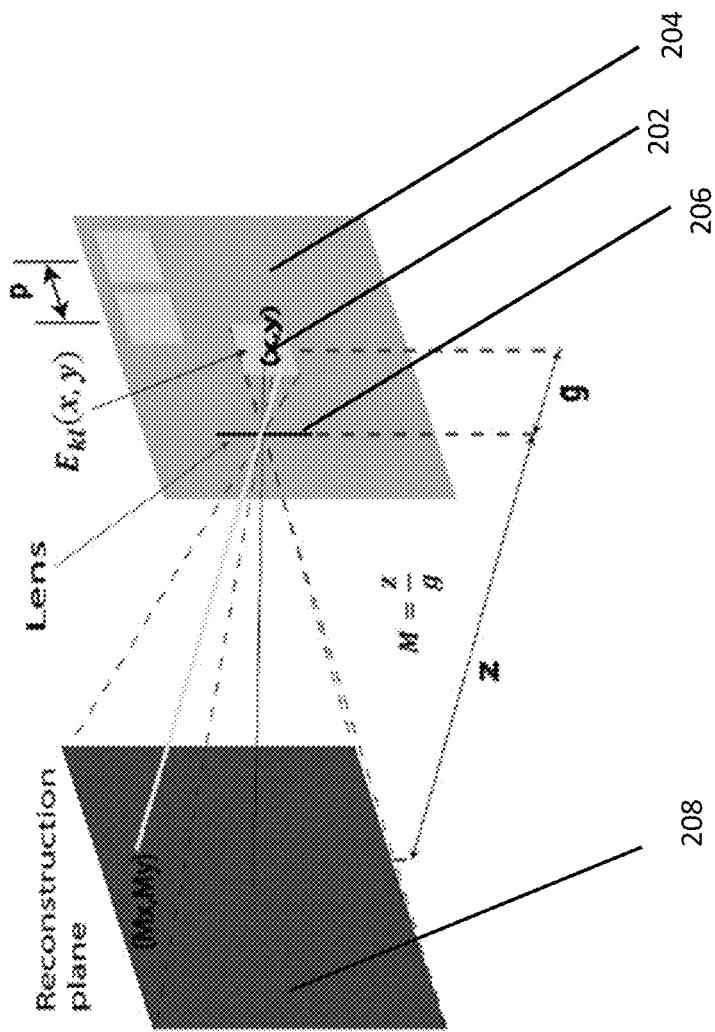
FIGS. 2A-B illustrate a three-dimensional scene reconstruction by back projecting elemental images through virtual pinholes using a camera array to sense the 3D scene according to the present disclosure.
Figure 2B:
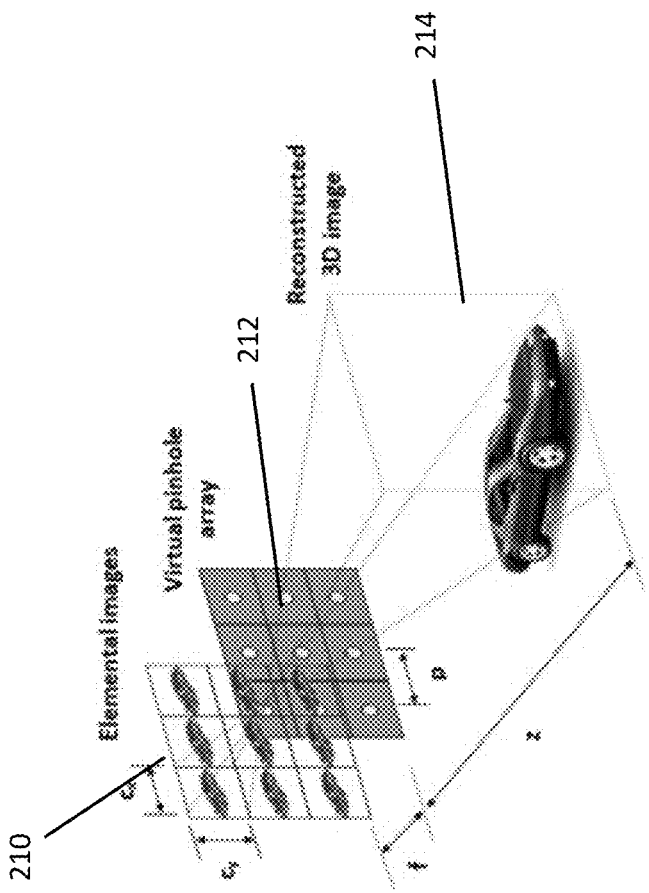
Figure 2B:
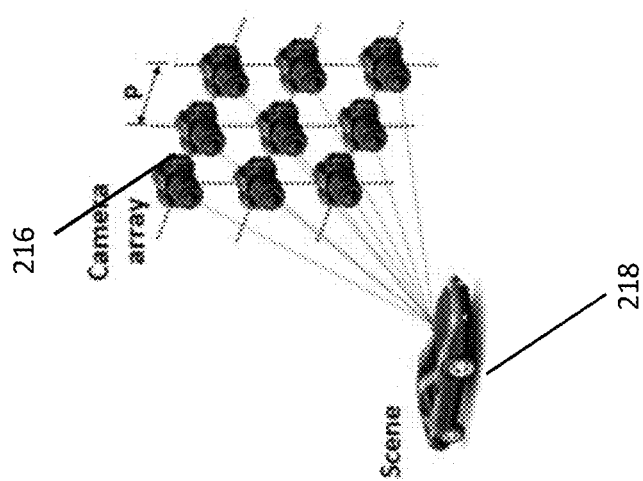

With reference to FIGS. 2A-B, the three-dimensional scene reconstruction by back projecting the elemental images through virtual pinholes is illustrated according to the present disclosure. FIG. 2A illustrates a single elemental image back-projected through its own viewpoint. Back projection is formed by smearing each view of the elemental images back through the lens in the direction it was originally acquired. The final back projected reconstructed image is then taken as the sum of all the back projected views of the elemental images. For example, a single camera or a camera array 204 can capture multiple elemental images representing slightly different perspectives. A single elemental image 202 is captured by a camera or camera array 204 and back projected through the lens 206 to the reconstruction plane 208. In FIG. 2a, g is the focal length of the imaging optics, p is the pitch of the cameras, and M is the magnification factor (M=z/g). The focal length is the distance between the lens 206 and the camera or camera array. The pitch of the camera can represent the rotation of the camera. The magnification factor can represent how large or small the image can be reproduced on the reconstruction plane 208.

Turning to FIG. 2B, a 3D scene captured with a camera array and a superposition of the ray cones projected from the elemental images reconstructs the 3D scene is illustrated. A camera array 216 including multiple image capturing devices can capture the 3D scene 218. In some embodiments, the camera array 216 can be used to capture a 3D scene from long ranges and through obscurations. In other embodiments the 3D scene can be captured using a single camera and lens array.

FIG. 2B also illustrates a superposition of the ray cones projected from the elemental images reconstructing the 3D scene. For example, the elemental images 210 represent the images of a car in various perspectives. Each of the elemental images 210 are projected through the virtual pinhole array 212 to produce a reconstructed image 214. The superposition of properly shifted elemental images providing the 3D reconstructed images is executed according to the following equation:

$$I(x, y, z) = \frac{1}{O(x, y)} \sum_{k=0}^{K-1} \sum_{l=0}^{L-1} E_{kl}[x', y'] \qquad (1)$$

with $$x' = x - k\frac{N_x \cdot p}{c_x \cdot M}, \quad y' = y - l\frac{N_y \cdot p}{c_y \cdot M}.$$

In equation 1, I(x, y, z) represents the intensity of the reconstructed 3D image at depth z, x and y are the indexes of the pixel, $E_{kl}$ represents the intensity of the kth row and lth column elemental image, $N_x \times N_y$ is the total number of pixels for each elemental image, M is the magnification factor, $c_x \times c_y$ is the physical size of the camera sensor, and O(x,y) is the overlapping number matrix.

In an exemplary embodiment, the acquisition strategy involves capturing 3D information using an array of image sensors distributed in an homogeneous or (alternatively) random grid, such as synthetic aperture integral imaging (SAII). The longitudinal resolution of the system is given by the following equation:

$$\Delta z_{min} = \frac{\mu z^2}{P_m g - \mu z}, \qquad (2)$$

In equation 2, $\mu$ is the pixel size, z is the object range, $P_m$ is the maximum parallax, and g is the distance between the imaging lens and the sensor. The minimum longitudinal resolution is subject to the following constraints:

$$P_m g \leq \frac{z N_{\{x,y\}} \mu}{2}. \qquad (3)$$

In equation 3, $N_{\{x,y\}}$ is the number of camera pixels in each direction, (x,y), $\mu$ is the pixel size, z is the object range, $P_m$ is the maximum parallax, and g is the distance between the imaging lens and the sensor.

In another embodiment, 3D information can be captured using image sequences. In this embodiment, 3D surface models can be automatically extracted from a sequence of images of an object taken from a camera. A scaled version of the object is reconstructed.

Figure 3:
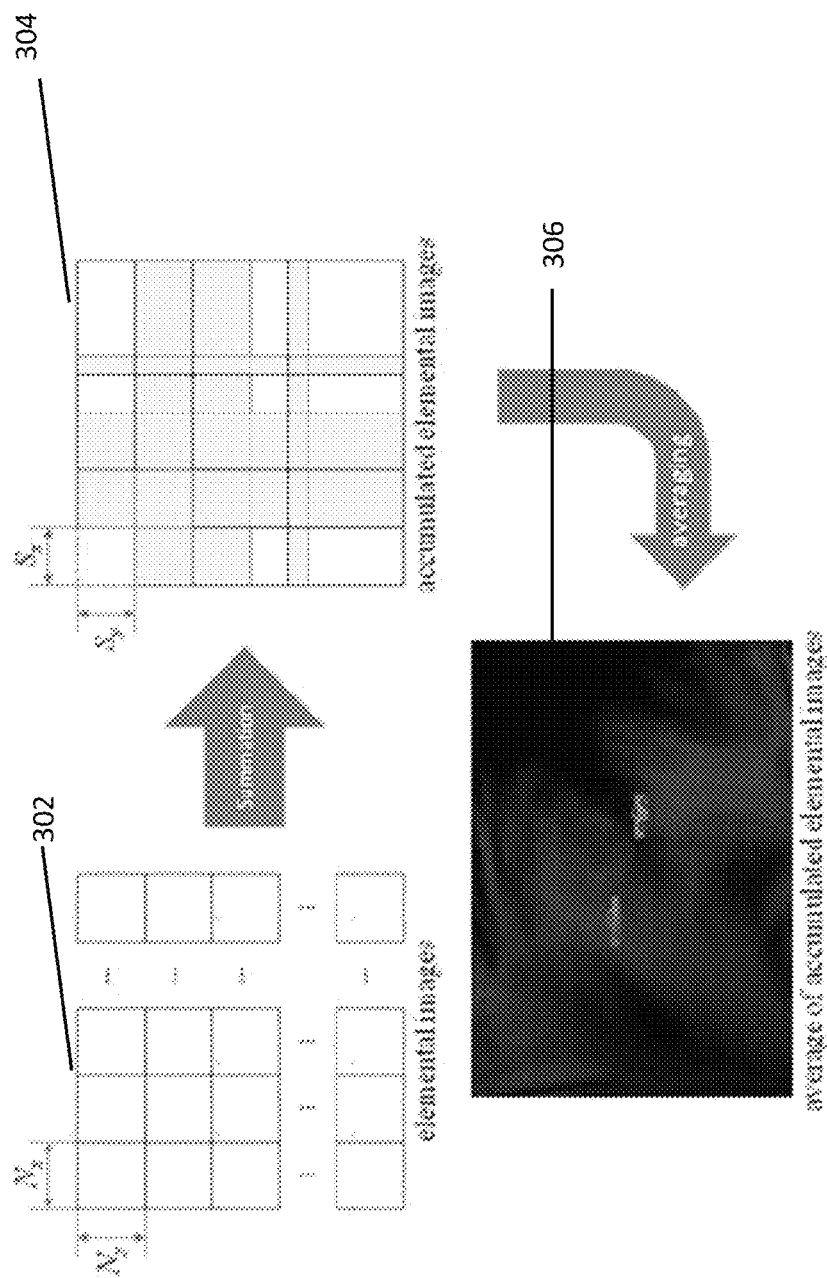
FIG. 3 illustrate a computational reconstruction of multiple elemental images according to the present disclosure.

With reference to FIG. 3, a computational reconstruction of multiple elemental images is illustrated. As mentioned above, back projection is formed by smearing each view of the elemental images back through the lens in the direction it was originally acquired. The final back projected reconstructed image is then taken as the sum of all the back projected views of the elemental images. For example, each of the elemental images 302 is projected on the desired reconstruction plane and overlaps with all other back-projected elemental images. A sum of all the back-projected images is taken to produce the accumulated images 304. The back projected accumulated elemental images 304 are averaged to create a reconstructed image 306.

Figure 4:
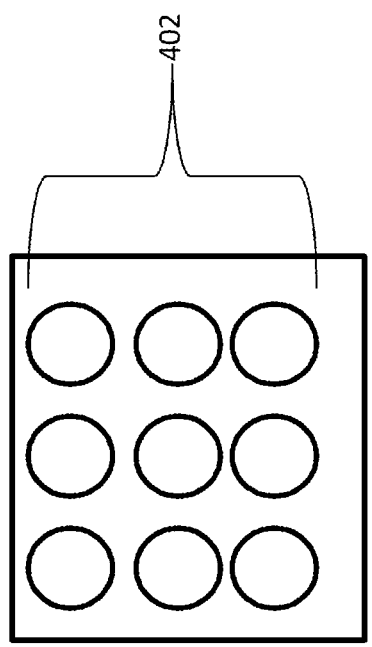
FIG. 4 illustrates an exemplary camera array of 3×3 cameras implementing an exemplary SAII system in focused or resolution priority mode according to the present disclosure.

With reference to FIG. 4, in a non-limiting example, a camera array of 3×3 cameras implementing an exemplary SAII system in focused or resolution priority mode is illustrated. The camera array 402 includes three rows of cameras and three columns of cameras used to acquire the videos of the 3D gestures. The cameras can be still image cameras or moving image cameras. The exemplary system can obtain a higher resolution in the computational depth reconstructions as compared to the integral imaging systems based on a microlens array. Using a synchronization through a 1394 bus, multiple synchronized videos can be captured at a speed of 15 frames per second and a resolution of 1024×768 pixels. In other embodiments, the number of frames per second and resolution can vary. In order to eliminate errors generated by the uncertainty in location and orientation of the cameras, the acquired videos can be subsequently rectified in an off-line stage. The aim of the image rectification process is to project two or more images onto a common image plane to correct for the misalignment in relation to the positions and orientations of the original cameras. For each camera, the rectified image is obtained by applying an homography transformation between the original camera and the ideal one following a well-known calibration method. For each of the cameras in the camera array 402, the homogrpahy is obtained using the following equation:

$$H_{li} = P_{ideal,n} \cdot P_n^+, \qquad (4)$$

In equation 4, $H_n$ represents the homography, $P_n$ is the projection matrix for camera n obtained through the calibration process, $P_n^+$ is its pseudo inverse, and $P_{ideal,n}$ is computed as:

$$P_{ideal,n} = K_{ideal} R_{ideal} | T_{ideal,n}], \qquad (5)$$

In equation 5, $[R_{ideal}|T_{ideal,n}]$ is a matrix resulting from the addition of $T_{ideal,n}$ to the right of matrix $R_{ideal}$. In this case, a rotation matrix $R_{ideal}$ that represents the camera arrangement is considered as the basis axes. Then, the ideal translation for each camera is found in order to obtain the 3×3 arrangement with the same distance between adjacent cameras ($T_{ideal,n}$). Finally, the common intrinsic matrix $K_{idel}$ is determined for the ideal multi-camera arrangement.

Figure 5A:
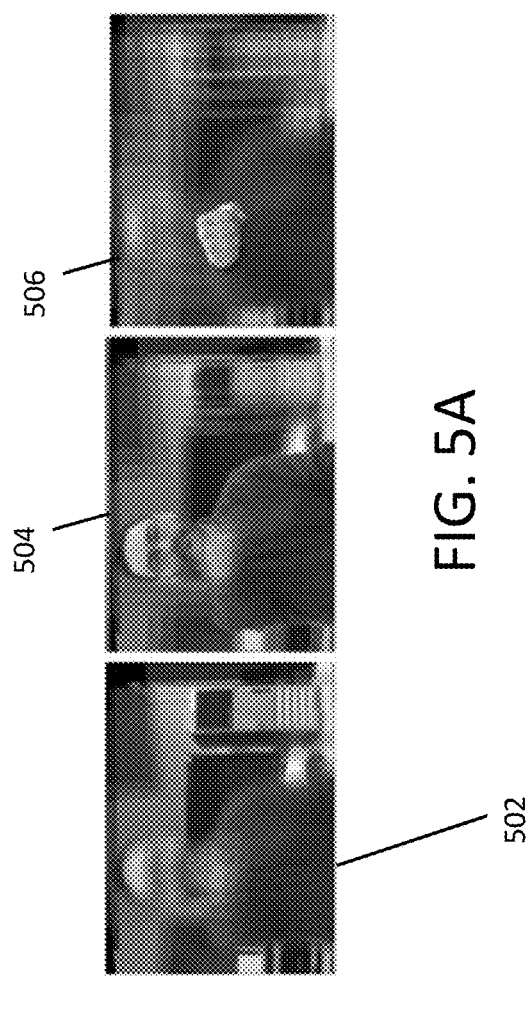
FIGS. 5A-B illustrate gesture recognition of multiple different gestures in images using integral imaging according to the present disclosure.
Figure 5B:
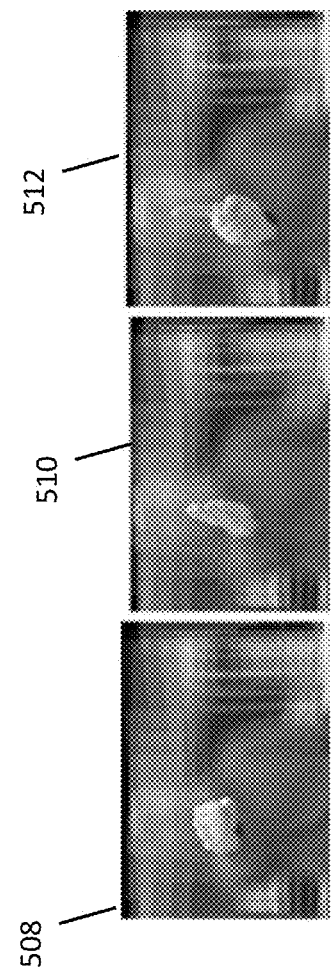

In a non-limiting example, with reference to FIGS. 5A-B, gesture recognition of multiple different gestures in images using integral imaging is illustrated. In the non-limiting example, the three gestures, using the right arm extended, can be but are not limited to: opening and closing the hand (Open), go to the left gesture (Left), deny gesture, made with the forefinger (Deny). The depth of field can include all the objects (including people) in the range of depths from 0.5 to 3.5 m which are in focus. For example, 10 people can be in front of the camera array (as shown in FIG. 4 402) at a distance of approximately 2.5 m. The gestures can be acquired with no other movement apart from the 10 people doing the gesture. In continuing with the example, for each of the 3 actions×10 people×2 repetitions=60 recorded videos, a 3D volume can be reconstructed for its first frame to calculate the distance where the gesture was in focus. The distance can be used for reconstructing the volume for the rest of the frames. In this process, every frame of each video is an elemental image for that video. For each video frame, nine elemental images were generated. Using the nine elemental images corresponding to each video frame, a 3D volume can be constructed. The reconstructed distance for which the hand gesture was in focus can be retained from the 3D volume. The volumetric (depth) reconstruction method for each frame can start with the elemental images and can be projected directly through a virtual pinhole array. For a fixed distance from this pinhole array, each elemental image is inversely projected through each synthesized pinhole in the array. Each inversely projected image is magnified by applying the magnification factor, which is the ratio of the distance between the pinhole array and the plane of reconstruction at a particular reconstruction distance. In order to determine the volumetric information, the process is repeated for all the reconstruction planes. The range of distances from which the reconstruction can be from 1 m to 3.5 m (the origin of distances is the plane of the 3×3 camera array) in 10 mm steps.

In FIG. 5A, three images 502-506 corresponding to three different reconstructions of re-focused planes of the same person and the same gesture are illustrated. In each one of these planes, one part of the scene is reconstructed to be in focus, either the background computers, the subject's face, or the subject's hand. In image 502 the background is reconstructed. In image 504, the face of the person is reconstructed. In image 506, the hand of the person is reconstructed. This illustrates the segmentation and sectional re-focusing capability of the integral imaging technique used for gesture recognition by exploiting the fact that only the object of interest in the image can be focused while the rest of the image is blurred. In FIG. 5B, exemplary images 508-512 for the three gestures reconstructed for the distance where the hand is in focus is illustrated. In images 508-512, the same part of the image is reconstructed while the rest of the image is blurred. In image 508, the hand gesture representing the "Open" gesture is in focus. In image 510, the hand gesture representing the "Left" gesture is in focus. In image 512, the hand gesture representing "Deny" is in focus.

Figure 6:
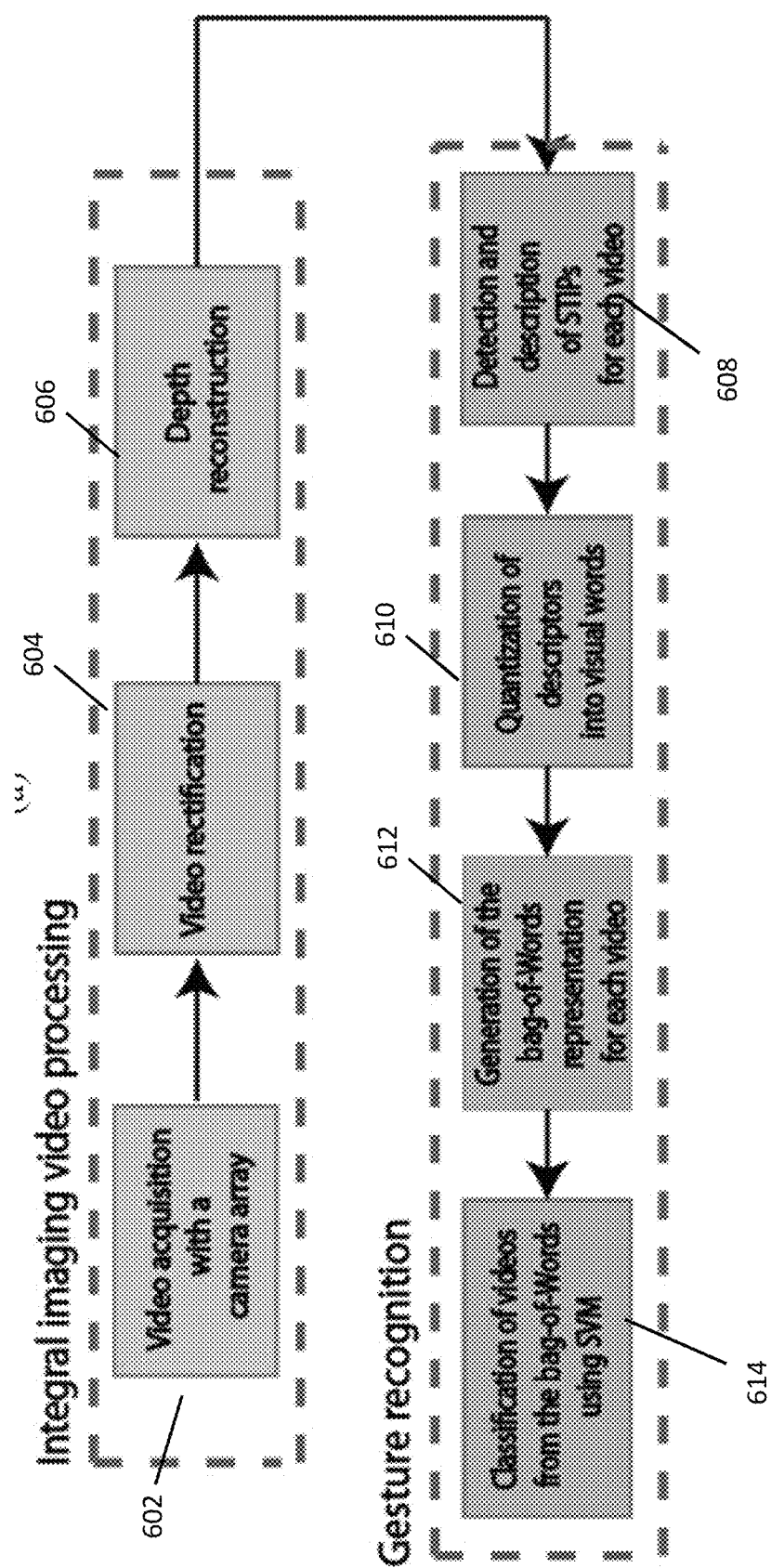
FIG. 6 is a flow chart of integral imaging video processing and gesture recognition according to the present disclosure.

With reference to FIG. 6, a flow chart of integral imaging video processing and gesture recognition is illustrated. The operations 602-606 describe the integral imaging video processing, while operations 608-614 describe the gesture recognition process. In operation 602, a single camera or a camera array can acquire videos of an object or a person. In operation 604, once the videos are acquired in order to eliminate errors generated by the uncertainty in location and orientation of the cameras, the acquired videos can be subsequently rectified in an off-line stage. The aim of the image rectification process is to project two or more images onto a common image plane to correct for the misalignment in relation to the positions and orientations of the original cameras in the camera array. For each camera, the rectified image is obtained by applying an homography transformation between the original camera and the ideal one following a well-known calibration method. In operation 606, the volumetric (depth) reconstruction method for each frame can start with the elemental images and can be projected directly through a virtual pinhole array. For a fixed distance from this pinhole array, each elemental image can be inversely projected through each synthesized pinhole in the array. Each inversely projected image can magnified by applying the magnification factor, which is the ratio of the distance between the pinhole array and the plane of reconstruction at a particular reconstruction distance. In order to determine the volumetric information, the process is repeated for all the reconstruction planes.

As mentioned above, operations 608-614 describe the gesture recognition process. The gesture recognition process can use a bag-of-words model. A Bag-of-Words model is based on the creation of a histogram of visual words (codewords). In operation 608, each of the spatiotemporal interest points (STIPs) for each video are detected and described. The STIPs are generated on each video, considered as 3D volumes (x,y,t), and histograms of gradients (HOG) and/or histograms of the optic flow (HOF) within small 3D volumes centered on the STIPs are assessed. The HOF and HOG descriptors are used for the purpose of object detection in an image. The 3D volume corresponding to the image sequence, $f: R^3 \mapsto R$, is convolved with an anisotropic Gaussian kernel:

$$L(\cdot; \sigma_l^2, \tau_l^2) = g(\cdot; \sigma_l^2, \tau_l^2) * f(\cdot), \tag{6}$$

$$g(x, y, t; \sigma_l^2, \tau_l^2) = \frac{1}{\sqrt{(2\pi)^3 \sigma_l^4 \tau_l^2}} \cdot e^{\frac{x^2+y^2}{2\sigma_l^2} \frac{t^2}{2\tau_l^2}}.$$

In equation 6, x, y, and t refer to the two spatial and the temporal dimensions, and $\sigma_l^2$ and $\tau_l^2$ are the spatial and temporal scales, respectively. Here, z can be fixed at the reconstructed plane of the STIPs. Given the partial derivatives of L, $L_a$; $a \in \{x, y, t\}$, the first-order derivative matrix is:

$$M' = \begin{pmatrix} L_x^2 & L_x L_y & L_x L_t \\ L_x L_y & L_y^2 & L_y L_t \\ L_x L_t & L_y L_t & L_t^2 \end{pmatrix}, \tag{7}$$

The first order derivative matrix is convolved to give the second order matrix $M = g(.; \sigma_i^2; \sigma_i^2) * M'$ with $\sigma_i^2 = s\sigma_l^2$ and $\tau_i^2 = s\tau_l^2$ for a given s. A 3D Harris function H can be defined by the 2D Harris function:

$$H = \det(M) - k\operatorname{trace}^3(M), \tag{8}$$

Local maxima of H identify the STIPs off, i.e., the points that exhibit large variations along both the spatial and temporal dimensions. This is known as the Harris 3D detector. A multi-scale approach is followed and scales $\{\sigma_l^2 = 2^{(1+1/2)}:l \in \{1, 2, \ldots, 6\}\}$ and $\{\tau_l = 2^l:l \in \{1, 2\}\}$ are used. As a pre-processing step before STIP detection, the frame rate of input videos can be increased so that the videos are longer. This allows the software to be able to process shorter videos and produce more STIPs. In addition, frames from the monocular camera as well as from the integral images can be resized to 481×271 pixels and only the red channel can be used.

In response to detecting the interest points, the interest points are described using local information. The size of the local 3D volume ($\delta_x$; $\delta_y$; $\delta_t$) around each interest point is a function of the considered scale: $\delta_x = \delta_y = 18\sigma_l$, $\delta_t = 8\tau_l$. Each local 3D volume was subdivided into a regular grid of $n_x \times n_y \times n_t$ cuboids, with $n_x = n_y = 3$, $n_t = 2$. The oriented HOG and the oriented HOF can be computed within each cuboid, with as few as 4 and 5 bins, respectively. Then, the histogram for each cuboid can be normalized and the histograms for all cuboids within the local 3D volume of an interest point can be concatenated to form the descriptors for that interest point, with dimensionalities of 72 (HOG), 90 (HOF), and 162 (HOG+HOF).

Figure 7A:
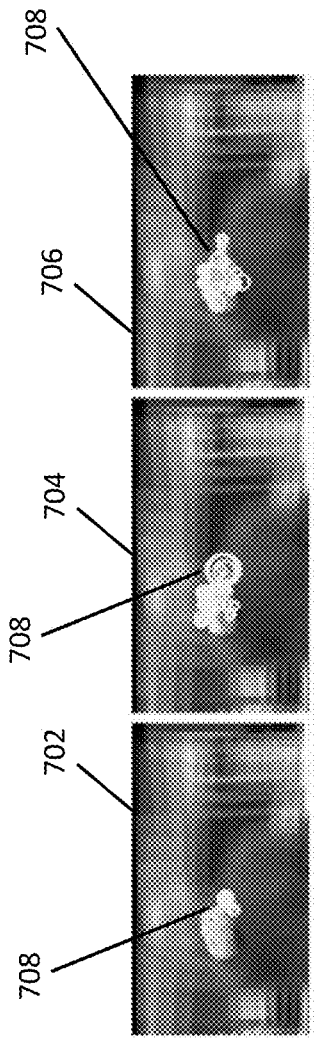
FIGS. 7A-C shows detected STIPs on the integral imaging sequences which are illustrated according to the present disclosure.
Figure 7B:
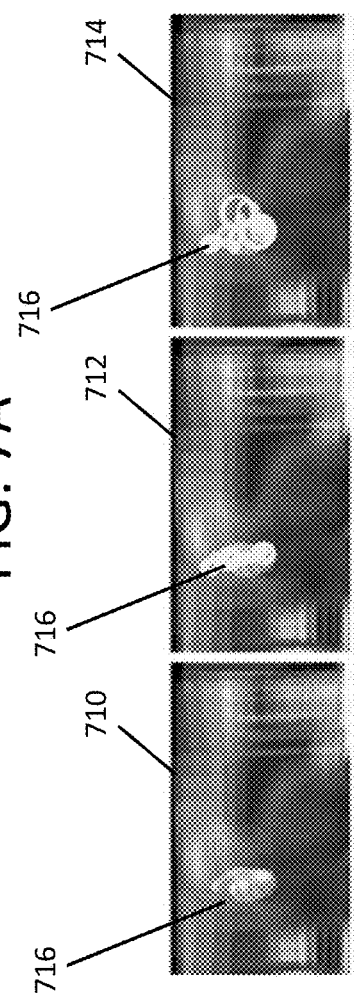
Figure 7C:
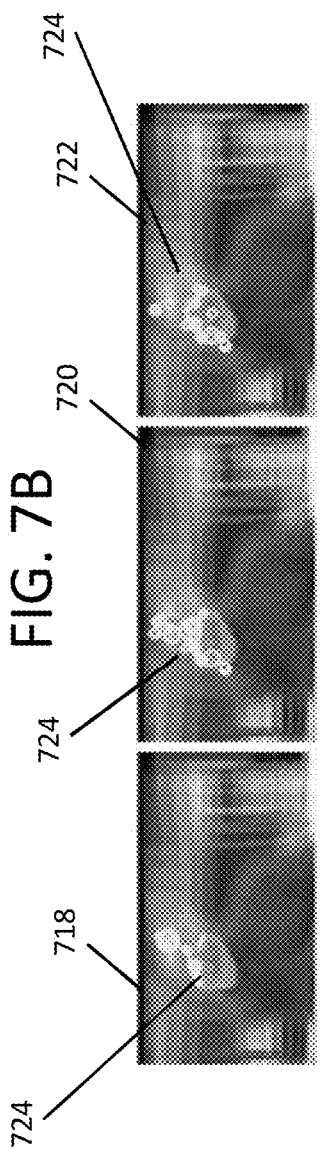

With reference to FIGS. 7A-C, detected STIPs on the integral imaging sequences are illustrated. The input is the reconstructed integral image at hand's depth. The detected STIPs are indicated by the circles in the different image frames. The size of the circle represents the scale at which the STIP was detected. For example, in FIG. 7A, image frames 702-706 show a person performing the "Open" gesture with their hand (as described above in FIGS. 5A-B). The "Open" gesture is detected and indicated using the circles 708. Turning to FIG. 7B, image frames 710-714 show a person performing the "Left" gesture using his hand (as described above in FIGS. 5A-B). The "Left" gesture is detected and indicated using the circles 716. Turning to FIG. 7C, image frames 718-722 show a person performing the "Deny" gesture using their hand (as described above in FIGS. 5A-B). The "Deny" gesture is detected and indicated using the circles 724.

Turning back to FIG. 6, in operation 610, the descriptors can be quantized into words through unsupervised clustering. Given n data points $\{x_i\}_{i=1}^n$, each of dimension d, the goal of k-means is to find a partition of these points into K clusters $\{C_j\}_{j=1}^K$ so that the sum of the distances of each data point $x_i$ to the mean of its cluster, $\mu_j$ (i.e., the cluster center) is minimized based on the following equation:

$$\sum_{j=1}^{K} \sum_{x_i \in C_j} \|x_i - \mu_j\|^2, \quad (9)$$

Since the optimization problem is known to be nondeterministic polynomial time (NP)-hard, k-means follows a greedy strategy by iteratively updating the cluster center and assigning each data point to its closest cluster until convergence.

In the present example, the STIPs of the subset of the videos in a training set can be used to find the clusters. Then, each STIP of this subset of videos, and those of the test set, can be assigned a cluster. Each cluster number represents a codeword (a visual word).

The result of k-means is initialization-dependent. For example, it can be executed five times on the same data and the clustering corresponding to minimal energy (i.e., the minimum value of Equation 9) is used. For efficiency, the Elkan approach can be used, which reduces the number of comparisons between data points and cluster centers by using triangular inequalities.

In operation 612, the Bag-of-Words (BoWs) are generated for each video. Each video can be represented by building a histogram of codewords. This histogram has K bins, where K corresponds to the number of clusters. Formally, $\{x_i\}_{i=1}^n$ can be the descriptors of the n STIPs detected in an input video, and $\{\mu_j\}_{j=1}^K$ can be the centers of the K clusters found with k-means applied to the training videos. the histogram $\{h_j\}_{j=1}^K$ of that video is computed as follows:

$$h_j = \sum_{i=1}^{n} [c(x_i) = j], \, j \in \{1, 2, \ldots K\}, \quad (10)$$

In equation 10,[.] represents the Iverson bracket notation for the Kronecker delta function, $h_j$ is the j-th bin of histogram h, and c(x) is the closest cluster of data point x, and c(x) is calculated using the following equation:

$$c(x) = \arg\min_{i \in \{1, 2, \ldots K\}} \|x - \mu_i\|^2, \quad (11)$$

In operation 614, the gesture recognition is performed from the BoWs using Support Vector Machine (SVM). Given S subjects, the BoWs of all videos (all actions and repetitions) for S−1 subjects can be used for training, whereas the BoWs for the videos of the remaining subject can be used for testing. The process is repeated S times, once per subject. The average performance over these S results can be reported.

For classification of the videos, support vector machines (SVM) can be used, since they are widely used classifiers with good generalization abilities thanks to their max-margin formulation. Given a (training) data set $\{(x_i; y_i)\}: x_i \in \mathbb{R}^d, y_i \in \{-1, 1\}\}_{i=1}^n$ of data points $x_i$ and their corresponding class labels $y_i$, the SVM aims to solve the following equation:

$$\arg\min_{w, \xi, b} \frac{1}{2}\|w\|^2 + C\sum_{i=1}^{n} \xi_i, \quad (12)$$

subject to:

$$y_i(w \cdot x_i - b) \geq 1 - \xi_i, \xi_i \geq 0, \quad (13)$$

In Equations 12 and 13, 1/‖w‖ determines the margin around the decision boundary that is to be maximized, are referred to as slack variables that account for the misclassification errors, and C is a regularization parameter that allows a trade-off solution balancing a large margin (good generalization) but yet small misclassification (good fitting to training data). The predicted class ŷ for a novel input x, ŷ(x), is found through the learned parameters (w,b) by the decision function ŷ(x=sign (w$^T$x+b).

A multi-class linear SVM (implementation of the Lib-SVM library) can be used. The regularization parameter C in equation 12 can be chosen through validation from the value in the set $10^{\{-4, -3, \ldots 4\}}$ that gives the best average validation accuracy. At each validation round when training with S−1 subjects, S−2 subjects can be used for training and the remaining one can used for testing.

Prior to learning and classification, histograms (the BoW representation) can be $L_1$-normalized. Then, each feature was individually re-scaled to the range [0,1]. The smallest and largest values of training data, used for the scaling, can be kept so that test data can be re-scaled using these values from the training set. Finally, histograms can be $L_2$ normalized.

Due to the random component of k-means, the descriptor quantization and the learning and prediction steps can be repeated 10 times. The reported performance is the average classification accuracy over these repetitions.

In exemplary embodiments, SAII can be used to detect human gestures from long range distances. For example, using SAII and computational reconstruction, 3D visualization of objects and 3D imaging through obscuration over very long distances can be generated using infrared cameras of various spatial bands such as a mid-wave infrared (MWIR) imager. By controlling the camera pose and measuring the relative change in camera position between the elemental images objects such as human gestures can be detected in 3D scenes from long ranges and through obscurations.

As a non-limiting example, 3D imaging through obscuration can take place with the distance between the infrared cameras and the target is over 200 meters. The image in the reconstruction plane at range is given by:

$$R(x, y, z) = \frac{1}{O(x, y, z)} \sum_{i=1}^{N} E_i\left(x - \frac{fp}{zD} + m_i, y + n_i\right). \quad (14)$$

In Equation 14, $E_i$ is the ith elemental image out of total images, is the camera focal length, D is the camera pixel pitch, p is the separation distance between image sensors, and $(m_i, n_i)$ are the fine position correction adjustments. Both (x,y) and $(m_i, n_i)$ are addressed in image pixel coordinates. 0 is the overlapping image number matrix. Equation 14 can be interpreted as a horizontal sliding and summing of the elemental images according to their relative perspectives of the scene at range and can be applied to the problem of obscuration penetration. Visually, the effect of R is that targets in or near the reconstruction plane are sharply defined while those at different ranges are blurred out. Focus is held constant in all the images.

As mentioned above SAII can also be used to 3D visualization of objects such as detecting human gestures in 3D scenes from long distances. For example, human gestures can be detected in a can be detected from as far as 2 kilometers (km).

As a non-limiting example, a procedure can be implemented to automatically search for a reference template of each target such as a human gesture in a 3D space. Template image data can be taken from a reference elemental image of the 3D space and the search function is defined in terms of the sum squared error between the template image and like-sized image chips. The geometry of the reconstruction algorithm allows for strong spatial constraints to be placed on the required reconstruction region and on the search function. To find the estimated range, z', with minimum sum squared error between, the template T(x,y), and the constrained reconstructed image, Rc(x,y,z) the following equation can be used:

$$z' = \operatorname*{argmin}_{z}\left\{\sum_{x}\sum_{y}[T(x, y) - R_c(x, y, z)]^2\right\}. \quad (15)$$

In integral imaging, longitudinal resolution depends on many system parameters, including detector size, total parallax, focal length, and so on. Minimum longitudinal resolution (MLR) is typically defined in terms of a minimum distance, such that all the elemental images are focused on the same plane and not overlapped. However, when $z \gg p_{max}$, where $p_{max}$ is the parallax or the largest possible separation between the elemental images, the elemental images can have a significant overlap. The MLR can be estimated using the following equation:

$$\Delta z \geq \frac{dz^2}{fp_{max}} \quad (16)$$

Equation 16 requires that one pixel shift between elemental images is necessary to detect a change in depth and that $z \gg f$. The longitudinal resolution can be improved by increasing the parallax and/or reducing the pixel size. By improving the longitudinal resolution of the elemental images, the target can be detected from long ranges.

Figure 8:
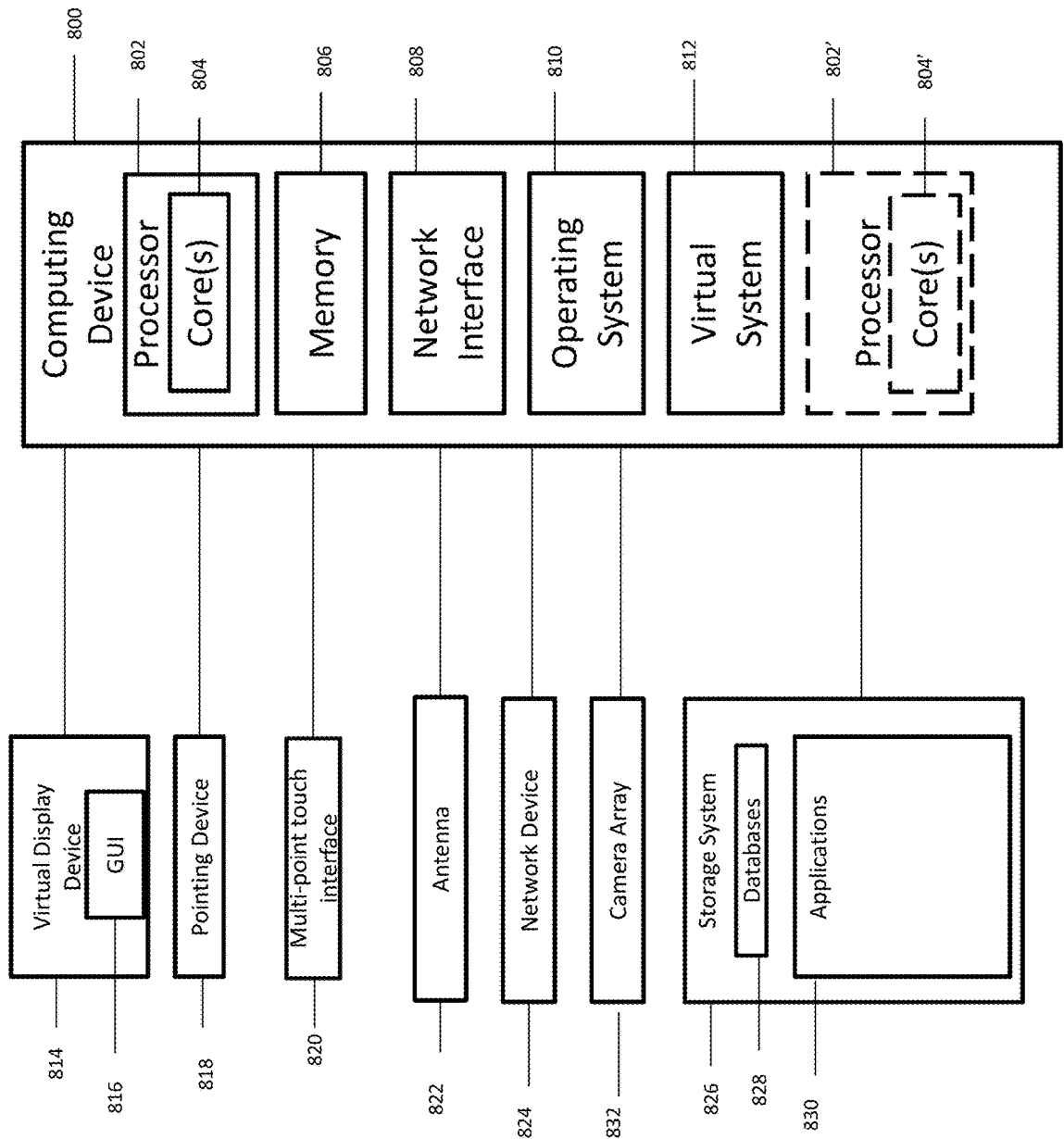
FIG. 8 illustrates a block diagram of an exemplary computing device for implementing exemplary embodiments of the present disclosure.

With reference to FIG. 8, a block diagram of an example computing device for implementing exemplary embodiments of the present disclosure is illustrated. An exemplary embodiment of detecting human gestures using integral imaging can be implemented by the computing device. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 800 may store computer-readable and computer-executable instructions or software (e.g., applications 830) for implementing exemplary operations of the computing device 800. The computing device 800 also includes configurable and/or programmable processor 802 and associated core(s) 804 and, optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for implementing exemplary embodiments of the present disclosure. Processor 802 and processor(s) 802' may each be a single core processor or multiple core (804 and 404') processor. Either or both of processor 802 and processor(s) 802' may be configured to execute one or more of the instructions described in connection with computing device 800.

The computing device 800 may include a camera array 832 to receive input videos. The camera array 832 may include multiple image capturing devices configured to capture multiple elemental images representing slightly different perspectives. The image capturing device may capture moving images. In other embodiments, the image capturing devices may capture still images.

Virtualization may be employed in the computing device 800 so that infrastructure and resources in the computing device 800 may be shared dynamically. A virtual machine 812 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof. A user may interact with the computing device 800 through a visual display device 814, such as a computer monitor, which may display one or more graphical user interfaces 816, multi touch interface 820, and a pointing device 818. The computing device 800 may also include one or more storage devices 826, such as a hard-drive, CD-ROM, or other computer readable media, for storing data and computer-readable instructions and/or software that implement exemplary embodiments of the present disclosure (e.g., applications). For example, exemplary storage device 826 can include one or more databases 828 for storing information regarding the physical objects. The databases 828 may be updated manually or automatically at any suitable time to add, delete, and/or update one or more data items in the databases.

The computing device 800 can include a network interface 808 configured to interface via one or more network devices 824 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 822 to facilitate wireless communication (e.g., via the network interface) between the computing device 800 and a network and/or between the computing device 800 and other computing devices. The network interface 408 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

The computing device 800 may run any operating system 810, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 800 and performing the operations described herein. In exemplary embodiments, the operating system 810 may be run in native mode or emulated mode. In an exemplary embodiment, the operating system 810 may be run on one or more cloud machine instances.

An exemplary flowchart is provided herein for illustrative purposes and is a non-limiting example of a method. One of ordinary skill in the art will recognize that exemplary methods may include more or fewer steps than those illustrated in the exemplary flowcharts.

We claim:

1. A system to identify a gesture of a moving human element in clear, unobstructed, or degraded environments, the system comprising:
    a camera array, configured to capture integral image data of a 3D scene, the integral image including 3D spatial coordinates and gray scale values of a plurality of elements in the 3D scene at each of a plurality of temporal coordinates, the plurality of elements including at least one moving human element;
    a computing system operatively coupled to the camera array, programmed to:
        capture the integral image data using the camera array, the integral image data including the at least one moving human element;
        numerically reconstruct a 3D scene video of the 3D scene from the captured integral image data based on temporal and spatial information of the plurality of elements in the 3D scene, the plurality of elements including the at least one moving human element, wherein the reconstructed 3D scene video includes a two-dimensional image frame at each of a plurality of different depths and at each of the plurality of temporal coordinates, and
        wherein, due to the integral image data reconstruction, for each two-dimensional image frame, elements that are physically located at a depth in the 3D scene corresponding to the two-dimensional image frame appear in focus in the two-dimensional image frame and elements that are not physically located at the depth corresponding to the two-dimensional image frame appear out-of-focus in the two-dimensional image frame;
        computationally determine a range of depths including the at least one moving human element in the reconstructed 3D scene video, wherein the at least one moving human element is a gesture;
        determine spatio-temporal interest points (STIPs) for the moving human element within the determined range of depths in the 3D scene video to characterize the at least one moving human element;
        identify the gesture of the at least one moving human element in the reconstructed 3D scene video based on the spatio-temporal interest points (STIPs) from the 3D scene video within the determined range of depths using at least one classification algorithm selected from a group consisting of a spatial-temporal correlation classification algorithm, a support vector machine based classification algorithm based on a histogram of a plurality of visual words using the spatio-temporal interest points (STIPs), and a neural networks based classification algorithm.

2. The system of claim 1, wherein to reconstruct a 3D scene video of the 3D scene, the computing system is programmed to:
    spatially back project the image data captured by each camera of the camera array at each of the plurality of temporal coordinates through a virtual pinhole array to superimpose ray cones of the image data from each camera;
    generate a plurality of 3D volumes wherein the plurality of 3D volumes includes a 3D volume for each of the plurality of temporal coordinates, wherein each 3D volume of the plurality of 3D volumes is generated as a plurality of two-dimensional image frames based on the spatially back-projected image data from the camera array at each of the plurality of different depths; and
    generate the 3D scene video based on a sequence of 3D volumes in the plurality of 3D volumes, wherein at least one of the 3D volumes includes the at least one moving human element.

3. The system of claim 1, wherein, in each two-dimensional image frame corresponding to a depth location of the at least one moving human element in the reconstructed 3D scene video, the at least one moving human element appears in focus while other elements at other depth locations in the 3D scene appear out of focus in the two-dimensional image frame corresponding to the depth location of the at least one moving human element.

4. The system of claim 1, wherein to determine the spatio-temporal interest points (STIPs) for the moving human element within the determined range of depths in the reconstructed 3D scene video, the computing system is programmed to assign a series of spatio-temporal interest points (STIPs) as descriptors of the at least one moving human element,
    wherein to identify the gesture, the computing system is programmed to:
        quantize, via the computing system, the descriptors into a plurality of visual words using clustering by assigning each STIP of the plurality of STIPs to a cluster of a plurality of clusters, wherein each cluster represents at least one visual word of the plurality of visual words;
        build, via the computing system, a histogram of occurrences of the plurality of visual words in the reconstructed 3D scene video; and
        identify the gesture by classifying, via the computing system, the reconstructed 3D scene video based on the histogram of the occurrences of the plurality of visual words.

5. The system of claim 1, wherein the camera array includes a plurality of image capturing devices.

6. The system of claim 1, wherein the camera array is a synthetic aperture camera.

7. The system of claim 1, wherein the camera array is a single camera with lenslet array or an array of cameras with each camera having a lenslet array.

8. The system of claim 1, wherein the classification algorithm is the support vector machine based classification algorithm, and wherein the computing system is programmed to use the support vector machine based classification algorithm to identify the gesture by using the spatial and temporal information in the 3D scene video to form feature vectors to detect the at least one moving human element.

9. The system of claim 1, wherein the gesture includes at least one selected from a group consisting of facial expressions, eye movements, movements of lips and mouth, movements of a torso, movements of a body, movements of an arm, movements of a hand, movements of a finger, movements of a leg, movements of a foot, and movements of any body part or entire body.

10. The system of claim 1, the camera array further comprising a plurality of image sensors of a plurality of spectral bands including spectral bands in the IR spectrum, wherein each image sensor of the plurality of image sensors is configured to capture a plurality of elemental images of the 3D scene.

11. A method to identify a gesture of a moving human element in clear, unobstructed or degraded environments, the method comprising:
   capturing, via a camera array, integral image data of a 3D scene, the integral image data including 3D spatial coordinates and gray scale values of a plurality of elements in the 3D scene at each of a plurality of temporal coordinates, the plurality of elements including at least one moving human element;
   numerically reconstructing, via a computing system operatively coupled to the camera array, a 3D scene video of the 3D scene based on the temporal and spatial information of the plurality of elements in the 3D scene, the plurality of elements including the at least one moving human element,
      wherein numerically reconstructing the 3D scene video includes generating the reconstructed 3D scene video that includes a two-dimensional image frame at each of a plurality of different depths and at each of a plurality of temporal coordinates, and
      wherein, due to the integral image data reconstruction, for each two-dimensional image frame, elements that are physically located at a depth in the 3D scene corresponding to the two-dimensional image frame appear in focus in the two-dimensional image frame and elements that are not physically located at the depth corresponding to the two-dimensional image frame appear out-of-focus in the two-dimensional image frame;
   computationally determining, by the computing system, a range of depths including the at least one moving human element in the reconstructed 3D scene video, wherein the at least one moving human element is a gesture; and
   identifying, via the computing system, the gesture of the at least one moving human element in the 3D scene based on an analysis of image data within the determined range of depths in the reconstructed 3D scene video.

12. The method of claim 11, wherein, in each two-dimensional image frame corresponding to a depth location of the at least one moving human element in the reconstructed 3D scene video, the at least one moving human element in the 3D scene appears in focus while other elements at other depth locations in the 3D scene appear out of focus in the two-dimensional image frame corresponding to the depth location of the at least one moving human element.

13. The method of claim 11, wherein to detect the at least one moving human element, the method further comprising:
   assigning, via the computing system, a series of spatio-temporal interest points (STIPs) as descriptors of the at least one moving human element in the reconstructed 3D scene video;
   quantizing, via the computing system, the descriptors into a plurality of visual words using clustering by assigning each STIP from the plurality of STIPs to a cluster in a plurality of clusters, wherein each cluster represents at least one visual word of the plurality of visual words;
   building, via the computing system, a histogram of occurrences of the plurality of visual words in the reconstructed 3D scene video; and
   identifying the gesture by classifying, via the computing system, the reconstructed 3D scene video based on the histogram of the occurrences of the plurality of visual words.

14. The method of claim 11, wherein capturing the integral image data of the 3D scene includes capturing the integral image data using the camera array that includes a plurality of image capturing devices.

15. The method of claim 11, wherein capturing the integral image data of the 3D scene includes capturing the integral image data using a synthetic aperture camera.

16. The method of claim 11, wherein capturing the integral image data of the 3D scene includes capturing the integral image data using a single camera with a lenset array or a plurality of cameras each including a lenslet array.

17. The method of claim 11, wherein identifying the gesture based on the analysis of the image data within the determined range of depths in the reconstructed 3D scene video includes applying a support vector machine classification algorithm that uses the spatial and temporal information in the 3D scene video and forms feature vectors to detect the at least one moving human element.

18. The method of claim 11, wherein identifying the gesture based on the analysis of the image data within the determined range of depths in the reconstructed 3D scene video includes identifying at least one selected from a group consisting of facial expressions, eye movements, movements of lips and mouth, movements of a torso, movements of a body, movements of an arm, movements of a hand, movements of a finger, movements of a leg, movements of a foot, and movements of any body part.

19. The method of claim 11, wherein capturing the integral image data of the 3D scene includes capturing, via each of a plurality of cameras of the camera array a plurality of elemental images of the 3D scene including the at least one moving human element to detect the at least one moving human element.

20. The method of claim 11, wherein the at least one moving human element in the 3D scene is partially occluded by a plurality of obscurations.

21. The method of claim 19, wherein numerically reconstructing the 3D scene video includes
   spatially back-projecting the elemental images captured by each camera of the camera array at each of the plurality of temporal coordinates through a virtual pinhole array to superimpose ray cones of the elemental image from each camera;
   generate a plurality of 3D volumes, wherein the plurality of 3D volumes includes a 3D volume for each of the plurality of temporal coordinates, wherein each 3D volume is generated as a plurality of two-dimensional image frames based on the spatially back-projected elemental images at each of the plurality of different depths; and
   generate the 3D scene video based on a sequence of 3D volumes in the plurality of 3D volumes, wherein at least one of the 3D volumes includes the at least one moving human element.

22. A system to identify a gesture of a moving human element in clear, unobstructed, or degraded environments, the system comprising:

a camera array, configured to capture integral image data of a 3D scene, the integral image including 3D spatial coordinates and gray scale values of a plurality of elements in the 3D scene at each of a plurality of temporal coordinates, the plurality of elements including at least one moving human element;

a computing system operatively coupled to the camera array, programmed to:
    capture the integral image data using the camera array, the integral image data including the at least one moving human element;
    numerically reconstruct a 3D scene video of the 3D scene from the captured integral image data based on temporal and spatial information of the plurality of elements in the 3D scene, the plurality of elements including the at least one moving human element,
        wherein the reconstructed 3D scene video includes a two-dimensional image frame at each of a plurality of different depths and at each of the plurality of temporal coordinates, and
        wherein, due to the integral image data reconstruction, for each two-dimensional image frame, elements that are physically located at a depth in the 3D scene corresponding to the two-dimensional image frame appear in focus in the two-dimensional image frame and elements that are not physically located at the depth corresponding to the two-dimensional image frame appear out-of-focus in the two-dimensional image frame;
    computationally determine a range of depths including the at least one moving human element in the reconstructed 3D scene, wherein the at least one moving human element is a gesture;
    identify the gesture of the at least one moving human element in the reconstructed 3D scene video using a spatial-temporal correlation classification algorithm.

* * * * *